United States Patent [19]

Satake

[11] Patent Number: 5,076,157
[45] Date of Patent: Dec. 31, 1991

[54] COFFEE BEAN POLISHING APPARATUS

[75] Inventor: Toshihiko Satake, Higashihiroshima, Japan

[73] Assignee: Satake Engineering Co., Ltd., Tokyo, Japan

[21] Appl. No.: 592,701

[22] Filed: Oct. 3, 1990

[30] Foreign Application Priority Data

| Oct. 27, 1989 | [JP] | Japan | 1-281382 |
| Oct. 30, 1989 | [JP] | Japan | 1-284019 |
| Nov. 21, 1989 | [JP] | Japan | 1-304388 |
| Nov. 24, 1989 | [JP] | Japan | 1-305939 |
| Nov. 24, 1989 | [JP] | Japan | 1-305940 |
| Dec. 1, 1989 | [JP] | Japan | 1-313898 |

[51] Int. Cl.⁵ .......................... B02B 1/04; B02B 3/04; B02B 3/10; B02B 3/12
[52] U.S. Cl. ........................ 99/519; 99/520; 99/524; 99/528; 99/606; 99/611; 99/613; 99/626
[58] Field of Search .......... 99/518, 519, 520, 523–525, 99/528, 602, 605–607, 609–611, 612–615, 618, 619, 626; 426/481–483; 241/6, 7, 244–246

[56] References Cited

U.S. PATENT DOCUMENTS

| Re. 9,360 | 8/1880 | Walters | 99/626 |
| 329,230 | 10/1885 | Spitzer | 99/493 |
| 1,116,221 | 11/1914 | Beyschlag | 99/523 |
| 3,960,068 | 6/1976 | Salete | 99/610 |
| 4,061,788 | 12/1977 | Wommack | 426/479 |
| 4,148,251 | 4/1979 | Satake | 99/525 |
| 4,323,006 | 4/1982 | Satake | 99/519 |
| 4,324,175 | 4/1982 | Satake | 99/528 |
| 4,426,922 | 1/1984 | Yamamoto | 99/618 |
| 4,515,075 | 5/1985 | Satake | 99/611 |
| 4,843,957 | 7/1989 | Satake | 99/617 |

FOREIGN PATENT DOCUMENTS 0052535  10/1988  Japan ..................................... 99/519

Primary Examiner—Timothy F. Simone
Attorney, Agent, or Firm—Darby & Darby

[57] ABSTRACT

A green coffee bean polishing apparatus for removing silver skin from green coffee beans having the silver skins remaining after removal of parchment, comprises: a tubular member communicated at one end portion thereof with a supply port for green coffee beans to be polished and at the other end portion thereof with a discharge port for the polished green coffee beans, the tubular member defining a polishing chamber therein and having a large number of through holes formed in a wall surface thereof; a polishing roll rotatably disposed in the polishing chamber for serving to polish the green coffee beans in the polishing chamber so as to separate the silver skin from the outer surface of each green coffee bean; and an air passing means for passing air from the polishing chamber to the outside of the tubular member so as to discharge the silver skin separated from the green coffee beans through the through holes in the tubular member. Accordingly, the silver skin can be ensured to be removed from the individual green coffee beans.

6 Claims, 6 Drawing Sheets

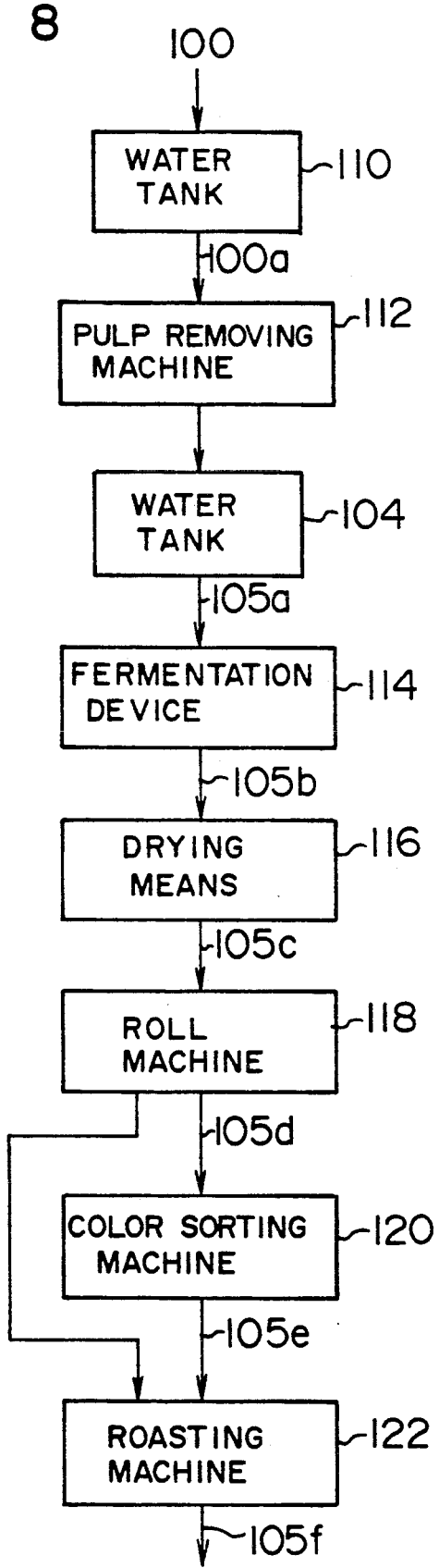

COFFEE BEAN POLISHING APPARATUS

FIELD OF INVENTION

The present invention relates to a method and an apparatus for polishing coffee beans, particularly raw on green coffee beans from each of which parchment is removed, prior to the subjection to roasting. The term "raw coffee bean" or "green coffee beam" used in the following description means the coffee bean that is not subjected to the roasting.

BACKGROUND OF INVENTION

A coffee cherry 100 comprises, as illustrated in a sectional view of FIG. 4, outermost pericarp 101, inside parchment 102, pulp 103 filling the portion between the pericarp 101 and the parchment 102, silver skin 104 inside the parchment 102, and seed wrapped in the silver skin 104, that is, what is called coffee bean 105. In this specification, it is noted that, so far as there is no possibility of causing misunderstanding, the term "coffee bean" may be used extensively in some cases, inclusive of the one which has the silver skin 104 on the surface of the coffee bean 105.

The coffee cherry 100 having the above structure is processed, after being reaped, through the procedure shown in a flow chart of FIG. 8.

First, the reaped cherries 100 are immersed in water in a tank 110, and only the cherries 100a sunk to the bottom of the tank 110 are taken out, so that only the cherries 100a having the mature seeds 105 are obtained Subsequently, the cherries 100a thus obtained are put into a pulp removing machine 112 so that the pericarp 101 and the pulp 103 are removed from each of the cherries 100a which are then immersed again in water in a tank 104 so that the pulp 103 and the like floating on the water is washed away.

Raw or green coffee beans 105a thus obtained are fermented by a fermentation device 114. The fermentation by the fermentation device 114 is continued for 12 to 18 hours at high temperature or 30 to 40 hours at low temperature. Raw coffee beans 105b after the subjection to the fermentation process are washed in water while being stirred up, and then dried by a drying means 116 in a drying field, thus obtaining parchment coffee beans 105c each having the parchment 102 wrapped thereon. Drying of the coffee beans 105 is effected in the sun in the drying field or in a drying machine by heating with an artificial heating device.

The parchment coffee beans 105c are further subjected, in the drying field, an export port or an importing country, to a separation process by a roll machine 118 so that the parchment 102 is removed from each coffee bean real body 105 and sifted out through a screen.

Further, green or raw coffee beans 105d thus obtained are further put into a color sorting machine 120 in some cases so as to separate and remove the inferior raw coffee beans the color of which is changed due to must, damages by blight and harmful insects, rot or immaturity, from the raw coffee beans 105e of good quality in accordance with the difference in color.

However, the raw coffee beans 105d obtained through the separation process by the roll machine 118 often contain the one that the silver skin 104 remains partially on the outer surface of the coffee bean real body 105 as shown in FIG. 5. Further, since the silver skin 104 is rolled into a center cut portion 106 of the coffee bean real body 105, it often remains as it is.

As a result, there has been a possibility that, in roasting by a roasting apparatus 122, the silver skin 104 is burnt to generate a bad smell which soaks into the roasted bean 105f.

In addition, in sorting the coffee beans 105d by the color sorting machine 120, it has been hard to prevent the raw coffee beans 105e of good or normal quality from being removed as inferior beans only due to the existence of the remaining silver skin 104 described above.

SUMMARY OF INVENTION

In view of the above points, an object of the present invention is to provide a raw or green coffee bean polishing apparatus which is capable of removing silver skin from the outer surface of each raw or green coffee bean.

To this end, there is provided according to the present invention a raw coffee bean polishing apparatus for removing silver skin from raw coffee beans having the silver skins remaining after removal of parchments, the apparatus comprising: a tubular member communicated at one end portion thereof with an inlet or supply port for raw coffee beans to be polished and at the other end portion thereof with a discharge port for the polished raw coffee beans, the tubular member defining a polishing chamber therein and having a large number of through-holes formed in a wall surface thereof; a polishing roll rotatably disposed in the polishing chamber for serving to polish the raw coffee beans in the polishing chamber so as to separate the silver skin from the outer surface of each raw coffee bean; and an air passing means for passing air from the polishing chamber to an outside of the tubular member therethrough so as to discharge the silver skin separated from the raw coffee beans through the through holes in the tubular member.

In the raw coffee bean polishing apparatus according to the present invention, the polishing roll for polishing the raw coffee beans in the polishing chamber to remove the silver skin from the outer surface of each raw coffee bean is rotatably disposed in the polishing chamber, so that the silver skin of the raw coffee beans can be removed from the raw bean real bodies within the polishing chamber. Further, in order to discharge the silver skin removed from the raw coffee beans out of the polishing chamber through the through holes in the tubular member, the air passing means is provided for passing the air from the polishing chamber to the outside of the tubular member constituting the peripheral wall of the polishing chamber, so that the silver skin removed from the raw coffee bean real bodies and the like can be positively discharged out of the polishing chamber, thereby preventing the polishing of the raw coffee beans in the polishing chamber from being hindered due to the existence of the removed silver skin, thus making it possible to efficiently remove the silver skin remaining on the surface of each coffee bean due to the polishing. In addition, the tubular member defining the peripheral wall of the polishing chamber is communicated at its one end portion with the supply port for the raw coffee beans to be polished and at its other end portion with the discharge port for the polished raw coffee beans, so that it is possible to polish the coffee beans continuously while feeding the coffee beans from one end portion toward the other end portion of the tubular member through the polishing chamber.

In accordance with a preferred embodiment of the present invention, the polishing roll is a friction type polishing roll. By the operation of the friction type polishing roll, the raw coffee beans are brought into frictional contact with each other so as to be polished in the polishing chamber, that is, they are rubbed together to cause the silver skin to be removed from the outer surface of each raw bean. In this case, it is preferred that the polishing apparatus has a moisture supplying device for supplying water into a region communicated with the polishing chamber. Since the surface of each raw coffee bean is humidified and softened by the moisture supplying device, removal of the silver skin due to the friction-polishing is ensured to be effected more efficiently.

In accordance with another preferred embodiment of the present invention, the polishing roll is a grinding type polishing roll. The grinding type polishing roll can effect the polishing of the raw coffee beans by forcibly scraping the silver skin even in the case that the surface of each raw coffee bean is hard and the silver skin is relatively hard. In this case, it is preferred that the polishing apparatus has a brush roll for brushing-polishing the raw coffee beans located on the downstream side of the grinding type polishing roll in the process line of removing the silver skin from each raw coffee bean. By the grinding-polishing due to the grinding type polishing roll, the silver skin tends to remain partially in the island form, for example, on the surface of each raw coffee bean. The remaining silver skin, however, can be removed by being scratched due to the brushing-polishing by the brush roll. Moreover, the brush roll can remove the silver skin in the center cut portion of each raw coffee bean by scraping out the same. For this reason, the brush roll may be provided independently of the grinding type polishing roll. In the case of the brush-polishing as well, it is preferred that the silver skin on the surface of each coffee bean is moistened or humidified, and softened in advance. It is more preferable that the polishing apparatus has a friction type polishing roll for polishing due to friction the raw coffee beans located on the downstream side of the brush roll in the process line of removing the silver skin from each raw coffee bean. In this case, even if the silver skin still remains on the outer surface of the raw coffee bean after the subjection to the grinding-polishing and the brushing-polishing, the silver skin on the surface of the raw coffee bean can be substantially completely removed due to the friction-polishing. In case of effecting the friction-polishing, it is preferred to moisten and soften the silver skin on the surface of each coffee bean in advance or during polishing.

In accordance with still another preferred embodiment of the present invention, a color sorting machine for sorting the coffee beans according to their color is provided on the downstream side of the polishing roll in the process line of removing the silver skin from each raw coffee bean. In this case, as the surface of each coffee bean is completely exposed due to removal of the silver skin therefrom, it is possible to exactly detect the color of each raw coffee bean real body, thereby making it possible to correctly separate the normal coffee beans from the inferior coffee beans according to their difference in color.

The foregoing and other objects, features as well as advantages of the invention will be made clearer from description of preferred embodiments of the invention, hereinafter, referring to attached drawings.

BRIEF DESCRIPTION OF DRAWINGS

FIG. 8 is a flow chart for explanation of the conventional procedure for obtaining roasted coffee beans.

DESCRIPTION OF PREFERRED EMBODIMENTS

Figure 2:
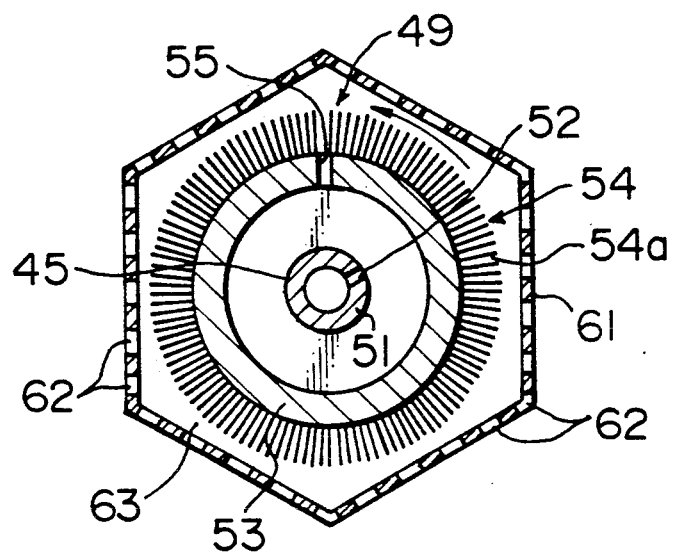
FIG. 2 is a sectional view taken along the line II—II in FIG. 1.
Figure 3:
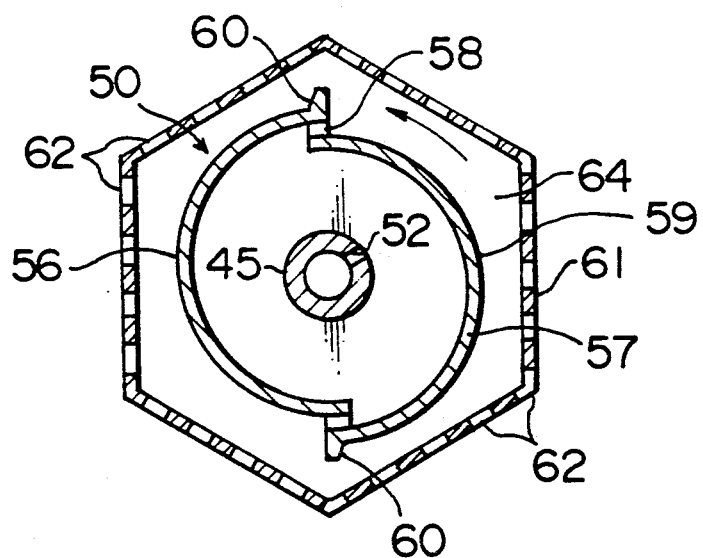
FIG. 3 is a sectional view taken along the line III—III in FIG. 1.

A coffee bean polishing apparatus 1 according to a preferred first embodiment of the present invention will now be described with reference to FIGS. 1 to 3.

Figure 1:
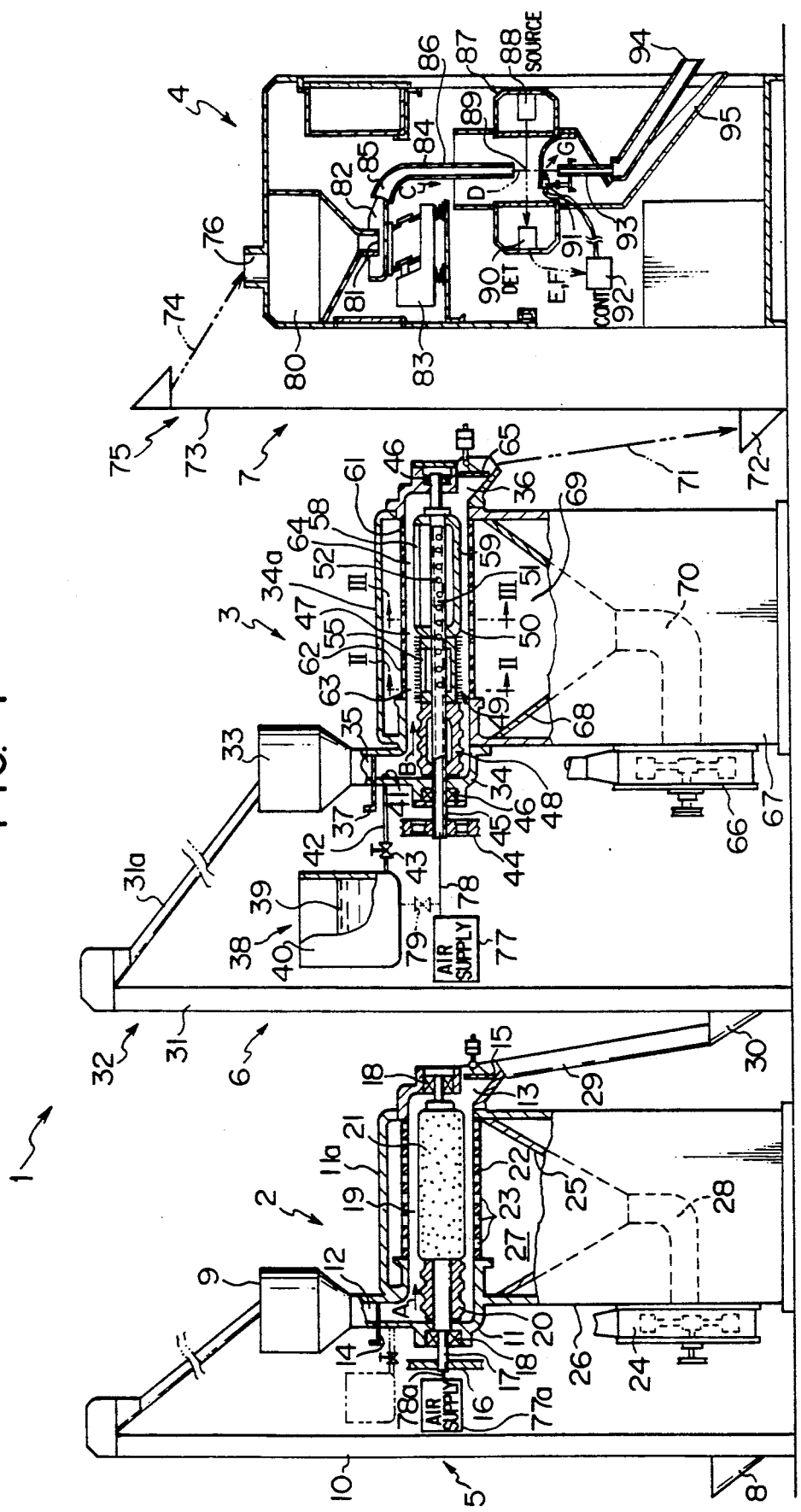
FIG. 1 is a schematic view of a coffee bean polishing apparatus according to a preferred embodiment of the present invention.

In FIG. 1, reference numeral 2 denotes a grinding type polishing machine, 3 denotes a brush-and-friction type polishing machine, 4 denotes a color sorting machine, 5 denotes a feeding mechanism for supplying raw or green coffee beans 105c after drying of FIG. 8 to the polishing machine 2, 6 denotes a transport mechanism for transporting the raw coffee beans 105 from 7 the polishing machine 2 to the polishing machine 3, and denotes another transport mechanism for transporting the raw coffee beans 105 from the polishing machine 3 to the sorting machine 4.

The feeding machine 5 is constituted by a feed hopper 8 into which the coffee beans 105c dried after fermentation are introduced, and an elevator 10 serving to feed the coffee beans 105c in the hopper 8 to a supply tank 9 of the polishing machine 2.

In the grinding type polishing machine 2, reference numeral 11 denotes a main body of the polishing machine 2. The polishing machine main body 11 has a supply port 12 connected with the supply tank 9 so as to allow the coffee beans 105c from the tank 9 to be introduced therethrough, and a discharge port 13 through which the coffee beans 105 having been subjected to the grinding-polishing process are discharged. Reference numeral 14 denotes a shutter serving to open and close the supply port 12, and reference numeral 15 denotes a pressure retaining plate for regulating the pressure applied to the coffee beans 105 to be polished. A main shaft 17 which is rotatively driven by a driving mechanism (not shown) through a pulley 16 is rotatably supported by the main body 11 through bearings 18. The main shaft 17 is fixedly mounted thereon with a screw feeder 20 serving to feed the coffee beans 105 introduced through the supply port 12 in the direction of an arrow A to a polishing chamber 19 to be described later, and a grinding-polishing roll 21 located on the downstream side of the feeder 20 with respect to the direction A in which the coffee beans 105 are fed. The grinding-polishing roll 21 has abrasive or grind-stone particles, serving as grinding cutting edge, bonded to the substantially entire surface of its cylindrical roll member. Reference numeral 22 denotes a hollow cylindrical polishing tube which has a large number of through holes 23 and is mounted on the polishing machine main body 11 so as to surround the outer periphery of the grinding-polishing roll 21. The polishing tube 22 cooperates with the grinding-polishing roll 21 to define therebetween the grinding-polishing chamber 19. The coffee beans 105c introduced through the supply port 12 and fed into the polishing chamber 19 by the screw feeder 20, which is rotated integrally with the main shaft 17, are subjected to the grinding-polishing in the polishing chamber 19 by the grinding-polishing roll 21 which is being rotated integrally with the main shaft 17 at a peripheral speed not smaller than 600 m/min., for example, to thereby permit the silver skin 104 remaining on the outer surface of each coffee bean real body 105 to be removed at least partially therefrom. For example, even if the surface of the coffee bean real body 105 is covered with the continuous silver skin 104 over its wide area, the grinding-polishing roll 21 can break partially the silver skin 104 to make it in the form of island. Reference numeral 24 denotes an exhauster mounted on a base 26 of the grinding type polishing machine 2, the exhauster 24 serving to discharge out of the polishing chamber 19 the silver skin 104 and the like removed from the coffee bean real bodies 105 in the polishing chamber 19 during the polishing operation through a dust chamber 27 defined around the outer periphery of the perforated polishing tube 22 by a funnel-shaped partition 25 and a peripheral wall 11a of the polishing machine main body 11 and through a duct 28 to the outside.

Air is further passed into the polishing chamber 19 from an air supply 77a such as a blower through a pipe 78a, a passage in the main shaft 20 and penetrating holes (not shown) in the polishing roll 21. Thus, the blower 77a and the exhauster 24 cooperatively constitute an air passing means for passing air from the polishing chamber 19 to the dust chamber 27 through the penetrating vent holes 23 of the tube 22 to remove the silver skin 104 and the like from the polishing chamber 19.

The coffee beans 105 from each of which the silver skin 104 is removed at least partially by the grinding type polishing machine 2 are fed to a supply tank 33 of the brush-and-friction type polishing machine 3 by a transport mechanism 32 which is constituted by a discharge chute 29, a feed hopper 30, an elevator 31 and a chute 31a.

In the brush-and-friction type polishing machine 3, reference numeral 34 denotes a main body of the polishing machine 3. The polishing machine main body 34 has a supply port 35 connected with the supply tank 33 so as to allow the coffee beans 105 from the tank 33 to be introduced therethrough, and a discharge port 36 through which the coffee beans 105 having been subjected to the friction-polishing process are discharged.

Reference numeral 37 denotes a shutter serving to open and close the supply port 35, and reference numeral 38 denotes a moisture supplying device for adding the moisture to the surface part of each of the coffee beans 105 introduced through the supply port 35. The moisture supplying device 38 comprises a tank 40 receiving therein water 39, a pipe 42 having one end thereof connected to the tank 40 and the other end 41 thereof opened in the form of a nozzle below the supply port 35, and a valve 43, such as a manually operated valve or an electromagnetic valve, serving to adjust the flow rate of the water 39 flowing through the pipe 42. The quantity of the water 39 to be introduced from the open end 41 toward the supply port 35 is adjusted to become a proper percentage of the weight of the coffee beans 105 passing through the supply port 35 within the range of 0.5-3%, in accordance with the hardness of the raw or green beans themselves mainly depending upon kind and growing district of the raw coffee beans to be processed and with the degree of remaining of the silver skin. The water injected in the mist form from the nozzle 41 to the coffee beans 105 acts to moisten and soften the surface of each coffee bean 105 having the silver skin 104 stuck thereon. In order to add the moisture to the surface of the coffee bean 105, a solution of inorganic matter such as salt water may be used as the water 39 in place of the plain water. Further, the water 39 may be jetted toward the coffee beans 105 in a polishing chamber 47 or in the way to the polishing chamber 47 instead of at the supply port 35.

A main shaft 45 which is rotatively driven by a driving mechanism (not shown) through a pulley 44 is rotatably supported by the main body 34 through bearings 46. The main shaft 45 is fixedly mounted thereon with a screw feeder 48 serving to feed the coffee beans 105 introduced through the supply port 35 in the direction of an arrow B to the polishing chamber 47 to be described later, a brush roll 49 located on the downstream side of the feeder 48 with respect to the direction B in which the coffee beans 105 are fed, and a friction polishing roll 50 located on the downstream side of the brush roll 49 with respect to the feeding direction B. The main shaft 45 is formed by a pipe the left end of which is opened, a large number of through holes 52 being formed in a wall 51 of the pipe, at regions of the brush roll 49 and the friction type polishing roll 50, for the purpose of passing air therethrough. The brush polishing roll 49 has a metallic brush 54 which is formed by implanting a large number of metallic wires or hairs 54a in the substantially entire surface of a cylindrical roll member 53. Although it is preferred that the brush 54 is made of a metallic material, it may be made of a plastic material in place of the metallic material so far as the brush has a suitable hardness and a suitable heat resistance.

The cylindrical roll 53 is formed in the wall thereof with an auxially extending slit which allows air to pass therethrough, that is, an air blast groove 55. The friction polishing roll 50 is constituted by a friction polishing roll main body 59 formed by combining together a pair of half-cylindrical parts 56 and 57 in slightly offset relation (in eccentric relation) to each other so as to form therebetween a pair of axially extending slits or air blast grooves 58, and a pair of agitating arm portions 60 extending from the roll main body 59 to project radially outwardly at positions where the diameter is increased due to eccentricity.

Figure 4:
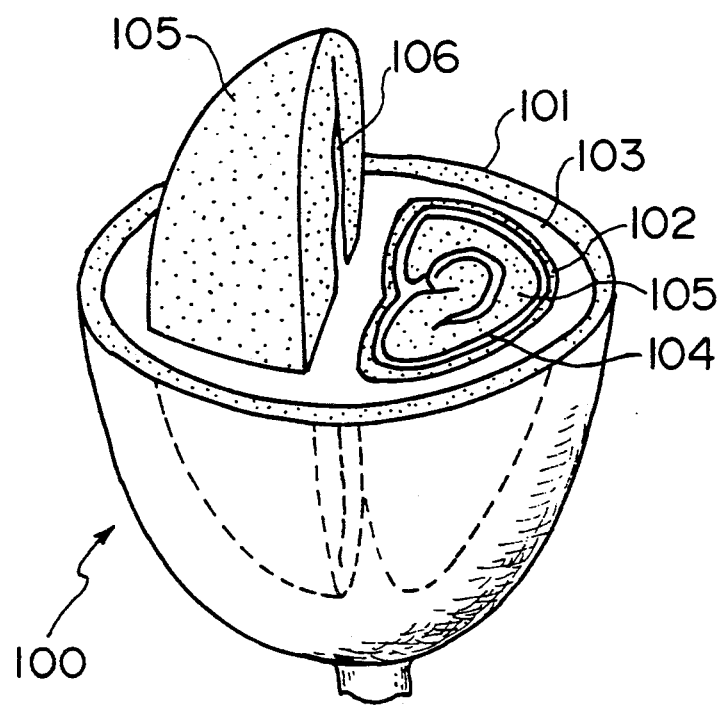
FIG. 4 is a partially fragmentary perspective view of a coffee cherry.
Figure 5:
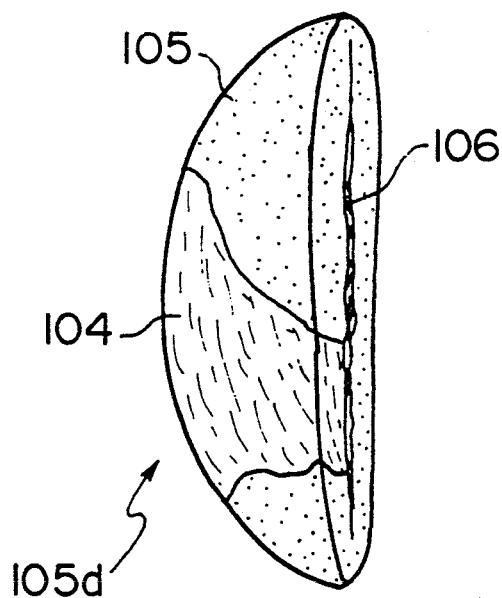
FIG. 5 is a perspective view of a coffee bean.

Reference numeral 61 denotes a hexagonal polishing tube which has a large number of through holes 62 and is mounted on the polishing machine main body 34 so as to surround the outer peripheries of the brush roll 49 and the friction polishing roll 50. The polishing tube 61 cooperates with the brush roll 49 and the friction polishing roll 50 to define therebetween a brush polishing chamber 63 and a friction polishing chamber 64, respectively. Namely, a polishing chamber 47 of the brush-and-friction type polishing machine 3 comprises the brush polishing chamber 63 and the friction polishing chamber 64 located on the downstream side thereof. The coffee beans 105 introduced through the supply port 35, immediately after being added with the moisture to the outer surface of each bean 105 by the moisture supplying device 38, are fed into the brush polishing chamber 63 by the screw feeder 48 which is rotated integrally with the main shaft 45. Then, the coffee beans 105 are subjected to the brushing-polishing in the polishing chamber 63 by the brush 54 of the brush polishing roll 49 which is being rotated in conformity with the main shaft 45, to thereby permit the silver skin 104 remaining on the outer surface of each coffee bean real body 105 to be at least partially removed or separated therefrom. In this case, since the tip end, in particular, of each hair 54a of the brush 54 is inserted even into the center cut portion or a longitudinal groove portion 106 of each coffee bean 105 (refer also to FIGS. 4 and 5), the moistened and softened silver skin 104 in the center cut portion 106 can be scraped out. Further, since the tip end of each hair 54a of the brush 54 rubs the outer surface of each coffee bean 105 in such a manner as to scratch from the edge of the silver skin 104 still remaining partially or in the form of island on the outer surface after being subjected to the polishing due to the grinding type polishing machine 2, the silver skin 104 can be separated from each coffee bean real body 105 much more effectively as compared with the case of rubbing to simply scratch the outer surface of the silver skin 104. In addition, since the brush 54 serves to sweep the surface of each coffee bean 105, dust, stripped silver skin 104 and the like adhered to the surface can be separated therefrom.

After further removal of the silver skin 104 by the brush polishing roll 49, the coffee beans 105 fed from the brush polishing chamber 63 to the friction polishing chamber 64 by the action of a transfer force applied in the direction B by the screw feeder 48 rotated integrally with the main shaft 45 are agitated in the polishing chamber 64 by the agitating projections 60 of the friction polishing roll 50 which is being rotated integrally with the main shaft 45 at a peripheral speed not greater than 300 m/min., for example. In this case, moistened and softened outer surfaces of the adjacent coffee beans 105 rub with each other so as to be subjected to the friction-polishing under a pressure, that is, at a polishing degree, regulated by a pressure regulating plate 65 provided at the discharge port 36, to thereby permit the silver skin 104 remaining on the outer surface of each coffee bean real body 105 to be stripped and separated therefrom substantially completely and efficiently. Since the friction polishing roll 50 is formed with the projections 60, the pressure applied to the coffee beans 105 in the polishing chamber 64 is varied in accordance with the rotation of the friction polishing roll 50 to enhance the function of agitating the coffee beans 105, and therefore, there is less possibility that a part of the coffee beans 105 in the polishing chamber 64 are not polished satisfactorily (mottle polishing). It is noted that, while the polishing proceeds, the silver skin 104 stripped from each coffee bean real body 105 is dropped and discharged through the holes 62 in the polishing tube 61. Further, since the polishing by the brush is mainly effected by the grinding force, the peripheral speed obtained by the rotation of the brush polishing roll may not be the same level as the peripheral speed of the grinding-polishing roll and the perforated polishing tube may be in the cylindrical shape in place of the polygonal shape. In addition, a desirable moistening degree of the coffee beans 105 in the brush type polishing is not always equal to that in the friction type polishing. Considering the above matters, the brush type polishing machine and the friction type polishing machine may be formed separately as described later, provided that the polishing machine is allowed to occupy a large installation space or area.

Reference numeral 77 denotes a blower for supplying air into the pipe-shaped main shaft 45 through an air supply pipe 78. A flow of air from the blower 77 is supplied in the blast form from the vent holes 52 in the main shaft 45 and the slits 55 and 58 into the polishing chamber 47 to thereby discharge the silver skin 104, dust and the like separated from the coffee bean real bodies 105 by the polishing rolls 49 and 50 to the outside of the tubular member 61 through the holes 62 thereof, thus enhancing the efficiency of polishing effected by the polishing rolls 49 and 50.

Reference numeral 66 denotes an exhauster mounted on a base 67 of the brush-and-friction type polishing machine 3. The excauster 66 is connected through a duct 70 with a dust chamber 69 defined around the outer periphery of the perforated polishing tube 61 by a funnel-shaped partition 68 and a peripheral wall 34a of the polishing machine main body 34 so as to serve to discharge the silver skin 104 and the like which are released from the polishing chamber 47 into the dust chamber 69.

More specifically, the blower 77 and the exhauster 66 cooperatively constitute an air passing means for passing air from the polishing chamber 47 to the dust chamber 69 through the penetrating vent holes 62 of the tube 61 to remove the silver skin 104 and the like from the polishing chamber 47.

Although the above description has been made on a case that the water is supplied at the supply port 35, the water may be supplied directly into the polishing chamber 47. In this case, the water may be supplied, for example, to the air supply passage 78 leading from the blower 77 to the internal passage of the pre-shaped main shaft 45 through a valve 79 which is capable of adjusting the flow rate as indicated by phantom lines in FIG. 1, from which the water is supplied into the polishing chamber 47 through the vent holes 52 and the slits 55 and 58 of the polishing rolls 49 and 50. In this case, moistening air or air containing water may be supplied from a portion of the main shaft 45 close to the discharge port 36 in place of a portion thereof close to the supply port 35 and the size of the vent holes 52 may be made larger toward the discharge port 36, for example, which serve to increase the percentage of water introduced into the friction polishing chamber 64 greater than that of water introduced into the brush polishing chamber 63. Further, moistening may be effected both at a portion near the supply port 35 and in the polishing chamber 47, and furthermore, at a plurality of portions along the course leading from the supply port 35 to the polishing chamber 47.

The coffee beans 105 from each of which the silver skin 104 has been removed by the brush-and-friction type polishing machine 3 are fed to an inlet opening 76 of the color sorting machine 4 by a transport mechanism 75 which is constituted by a discharge chute 71, a feed hopper 72, an elevator 73 and a chute 74.

In case that the raw or green coffee bean 105 itself is so hard that the silver skin is not stripped easily, a moisture supplying device (indicated by phantom lines) similar to the moisture supplying device 38 for the polishing machine 3, for example, may be provided as well for the grinding type polishing machine 2 mentioned before. However, in the case of the grinding type polishing machine 2, the amount of water to be added is selected to be relatively small as being about 0.2-0.4 wt % of the raw coffee beans in order to prevent the space between the grind stone particles on the grinding type polishing roll 21 from being filled up with the moistened silver powder, dust and the like.

In the color sorting machine 4, reference numeral 80 denotes a tank for storing the polished coffee beans 105 introduced through the inlet 76. The tank 80 is formed at the lower end thereof with an opening 81 through which the coffee beans 105 come down. Below the opening 81, a vibrating feed through 82 is disposed to receive the coffee beans 105 coming down bit by bit from the opening 81 of a small diameter. The vibrating feed through 82 is made to vibrate by a vibrator 83 so as to feed the coffee beans 105 received therein to an inlet portion 85 of a pipe 84 at its upstream end. A main body portion 86 of the pipe 84 has a diameter substantially equal to or slightly greater than the size of a piece of coffee bean 105 and extends vertically in the direction of an arrow C so that the coffee beans 105 are allowed to fall down one by one in the vertical direction C substantially along the center axis D of the main body portion 86. Reference numeral 87 denotes a color sensor for the coffee beans 105. The color sensor 87 is constituted by a light source 88 and a photodetector 90 serving to detect the color of each coffee bean 105 in response to the wavelength of the light reflected by the coffee bean 105D, after having been emitted from the light source 88, which is falling down through a detecting portion 89 along the vertical path line D (refer to U.S. Pat. Nos. 3,283,896, 3,482,686 and 4,940,850, for example, for the more elaborate color sensor which are incorporated herein by the reference thereto). The photodetector 90 produces a normal quality signal E when it is discerned that the color of the coffee bean 105 passing through the detecting portion 89 is that of normal beans (light green) and an abnormal quality signal F when it is discerned that the color of the coffee bean 105 passing through the detecting portion 89 is that of abnormal beans (blackish or whitish color, for example). Reference numeral 91 denotes an air nozzle and 92 denotes a driving control mechanism for controlling the driving of the air nozzle 91 to inject air therefrom. On receiving the inferior quality signal F from the detector 90, the driving control mechanism 92 drives the air nozzle 91 to inject air therefrom so as to blow off the coffee bean 105, which is falling down, in the direction of an arrow G. In the case that the driving control mechanism 92 receives the normal quality signal E from the detector 90 the driving control mechanism 92 keeps the air nozzle 91 inoperative so as to permit the coffee bean 105 to fall down along the dropping path D therefor into a catching or receiving trough and a pipe 93. The coffee beans 105 of normal quality having fallen down into the pipe 93 are discharged through a normal bean discharge port 94 so as to be used for subsequent purposes. On the other hand, the coffee beans of inferior quality blown off in the direction G are discharged through an abnormal color bean discharge port 95. Since discernment or identification of the color of the coffee bean 105 is effected after the silver skin 104 is substantially completely removed from each coffee bean 105 so that the quality of the coffee beans 105 (normal or inferior) can be correctly reflected in the color of the coffee beans 105, there is substantially no possibility in sorting the coffee beans 105 that the normal coffee bean is discerned as the inferior one by mistake, thereby making it possible to separate the coffee beans of normal quality from the inferior ones correctly. In consequence, the inferior coffee beans the color of which is changed due to must, damages by blight and harmful insects, rot or immaturity can be removed without fail.

In the case that no abnormal color coffee bean is virtually contained, for example, the color sorting machine 4 may be dispensed with in the first embodiment shown in FIG. 1.

Further, in the case that it is relatively easy to remove the silver skin 104, it is sufficient to use only one of the grinding type polishing machine 2 and the brush-and-friction type polishing machine 3. Incidentally, the brush-and-friction type polishing machine 3 may be substituted by a brush type polishing machine and a friction type polishing machine which are separate from each other, as described later. In addition, it is possible to connect a plurality of polishing machines of at least one type. Accordingly, arrangements available for the total polishing apparatus or system are as follows:

(i) at least one grinding type polishing machine,
(ii) at least one brush type polishing machine,
(iii) at least one friction type polishing machine,
(iv) combination of (i) and (ii),
(v) combination of (i) and (iii),
(vi) combination of (ii) and (iii), and
(vii) combination of (i), (ii) and (iii).

It is noted that a plurality of polishing machines may be united as the polishing machine 3 shown in FIG. 1. Further, with the arrangements described above, the coffee beans discharged through the discharge port of at least one polishing machine may be returned to the supply port of the at least one polishing machine so as to be circulated and polished repeatedly.

Selection from the above arrangements (i) to (vii) is effected in accordance with, for example, the characteristics of the coffee beans mainly depending upon kind and growing district of the raw coffee beans to be processed, that is, the hardness of the coffee beans themselves and the amount and portion of the silver skin remaining on each coffee bean, as well as the quality of the coffee beans, considering the facts that the grinding type polishing machine has a high grinding ability but the coffee beans subjected to the grinding-polishing thereby each have a coarse surface, that the friction type polishing machine can make smooth the surface of each coffee bean after the subjection to the friction polishing but the polishing efficiency thereof is low, and that the brush type polishing machine has the performance intermediate between that of the grinding type polishing machine and that of the friction type polishing machine but the brush is worn out in a relatively short term.

Figure 6:
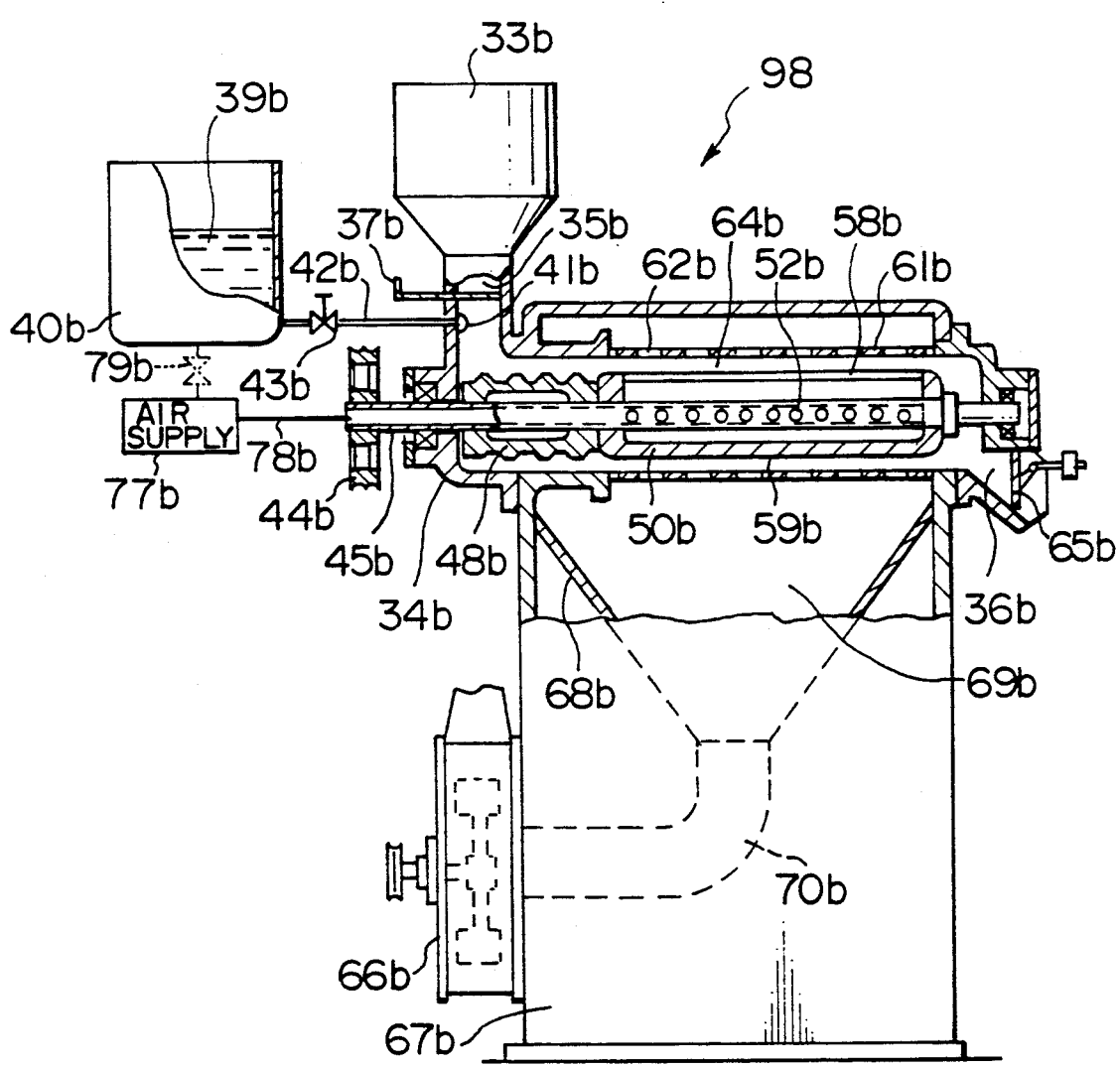
FIG. 6 is a sectional view of a coffee bean polishing apparatus according to another preferred embodiment of the present invention.

FIG. 6 illustrates an example of the arrangement in which a friction type polishing machine 98 is provided separately from the brush type polishing machine. In FIG. 6, the same members and components as those of the brush-and-friction type polishing machine 3 shown in FIG. 1 are denoted by the same reference numerals with suffix "b".

In the case that the friction type polishing machine 98 is formed separately from the brush type polishing machine, the percentage of water to be added is rather increased to about 1.0-3.0 wt %. for example, preferably to about 1.0-2.0 wt %, to thereby sufficiently soften the surface of each coffee bean with the water injected in the mist form from a nozzle 41b, which coffee bean is subjected to the friction polishing. In this case, not only the silver skin is removed but also the surface of each raw or green coffee bean is polished.

Figure 7:
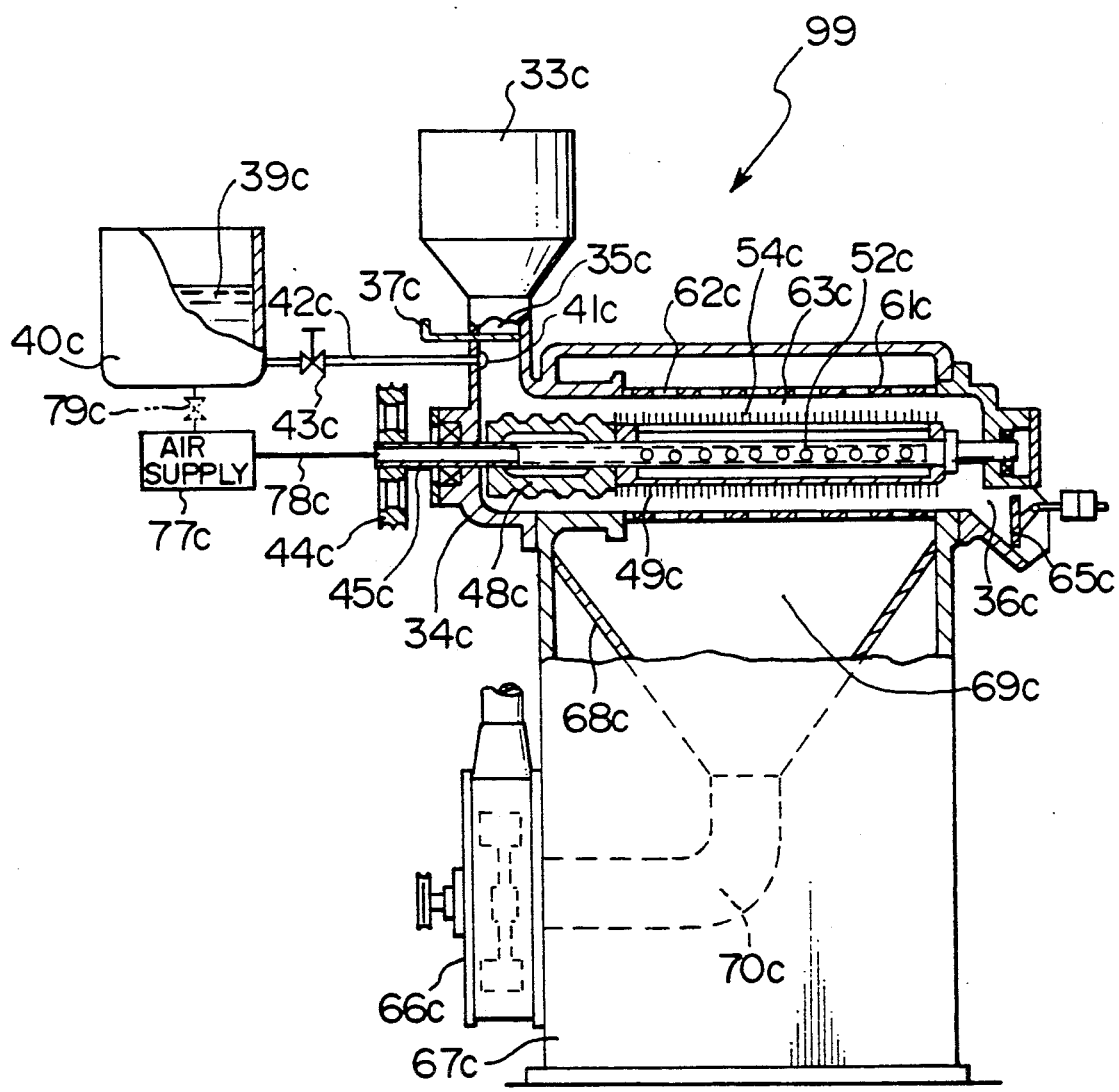
FIG. 7 is a sectional view of a coffee bean polishing apparatus according to still another preferred embodiment of the present invention.

Likewise, FIG. 7 illustrates an example of the arrangement in which a brush type polishing machine 99 is provided separately from the friction type polishing machine. In FIG. 7, the same members and components as those of the brush-and-friction type polishing machine 3 shown in FIG. 1 are denoted by the same reference numerals with suffix "c". In this case, however, a polishing tube 61c does not have a polygonal cross-section but a circular cross-section. Further, in order to improve the polishing efficiency due to the grinding by the brush, a brush polishing roll 49c is rotated at a peripheral speed not smaller than 600 m/min. The brush type polishing machine 99 is suitable for the polishing of the coffee beans of a medium hardness each having much silver skin 104 remaining particularly in the center cut portion 106 thereof.

In the case that the brush type polishing machine 99 is formed separately from the friction type polishing machine, the percentage of water to be added is rather reduced to about 0.5-1.0 wt %, for example, so that each coffee bean is softened to have a medium hardness after being moistened with the water injected in the mist form from a nozzle 41c.

What is claimed is:

1. A green coffee bean polishing apparatus for removing silver skin from green coffee beans having the silver skin remaining thereon after removal of parchment, said apparatus comprising:

a tubular member communicated at one end portion thereof with a supply port for green coffee beans to be polished and at the other end portion thereof with a discharge port for the polished green coffee beans, said tubular member defining a polishing chamber therein and having a large number of holes passing through a wall thereof;

a polishing roll rotatably disposed in said polishing chamber for serving to polish the green coffee beans in said polishing chamber so as to separate the silver skin from the outer surface of each green coffee bean, said polishing roll comprising a brush roll portion for scratching the silver skin and a friction type polishing roll portion for polishing the green coffee beans by friction to thereby substantially remove any of the silver skin still remaining on the outer surface of the green coffee beans, said friction type polishing roll portion being located on the downstream side of said brush roll portion in terms of a flow direction of the green coffee beans from the supply port to the discharge port;

a moisture supplying device for supplying water into a region of said apparatus which is in fluid communication with said polished chamber so that surfaces of the coffee beans are humidified when the coffee beans are polished in the polishing chamber; and an air passing means for passing air from said polishing chamber to an outside of said tubular member so as to discharge the silver skin separated from the green coffee beans through said holes in said wall of said tubular member.

2. A polishing apparatus according to claim 1, wherein said apparatus further comprises a grinding type polishing roll for forcibly scraping the silver skin.

3. A polishing apparatus according to claim 2, wherein said brush roll portion is located on a downstream side of said grinding type polishing roll is a process line for removing the silver skin from the green coffee beans.

4. A polishing apparatus according to claim 1, further comprising a color sorting machine for sorting the coffee beans according to their color provided on a downstream side of said polishing roll in a process line of removing the silver skin from the coffee beans.

5. A polishing apparatus according to claim 1, further comprising a moisture supplying device for supplying water into a region of said apparatus communicated with said polishing chamber, amount of said supplied water being 0.2-3% of a total weight of the coffee beans to be subjected to the polishing process.

6. A green coffee bean polishing apparatus for removing silver skin from green coffee beans having the silver skin remaining thereon after removal of parchment, said apparatus comprising:

a brush type polishing machine having a polishing chamber for polishing the green coffee beans therein by a rotating brush roll which effects a brushing operation;

a friction type polishing machine located on the downstream side of said brush type polishing roll in a process line for removing the silver skin from the green coffee beans and having a polishing chamber for polishing therein the green coffee beans which were subjected to the brushing operation by the brush type polishing roll;

a moisture supplying device for supplying water into regions of said brush type and friction type polishing machines communicated with said polishing chambers of said brush type and friction type polishing machines so that surfaces of the coffee beans are humidified when the coffee beans are polished in said polishing chambers; and an air passing means for passing air from each of said polishing chambers to the outside so as to discharge, from each polishing chamber, the silver skin separated from the green coffee beans.

* * * * *